United States Patent [19]
Dykstra

[11] Patent Number: 6,050,771
[45] Date of Patent: Apr. 18, 2000

[54] PALLET WORKSTATION ACCUMULATOR

[75] Inventor: Gerald L. Dykstra, Wyoming, Mich.

[73] Assignee: Industrial Resources of Michigan, Grand Rapids, Mich.

[21] Appl. No.: 08/935,183

[22] Filed: Sep. 22, 1997

[51] Int. Cl.[7] .............................. B65G 59/00; B25J 11/00
[52] U.S. Cl. .................................... 414/795.8; 414/798.9; 414/773; 414/779; 414/782
[58] Field of Search .............. 414/795.8, 798.9, 414/796.4, 796.9, 773, 779, 782, 928, 929; 198/409, 412

[56] References Cited

U.S. PATENT DOCUMENTS

| | | | |
|---|---|---|---|
| 3,232,410 | 2/1966 | Teago | 198/409 |
| 3,521,763 | 7/1970 | Heide et al. | 414/795.8 |
| 4,037,734 | 7/1977 | Erdman | 414/796.4 |
| 4,242,029 | 12/1980 | Musgrave | 198/412 |
| 4,249,847 | 2/1981 | Tokuno | 414/795.8 |
| 4,462,746 | 7/1984 | Smets et al. | 414/330 |
| 4,492,016 | 1/1985 | Smets et al. | 29/432 |
| 4,983,098 | 1/1991 | Heisler | 414/795.8 |

FOREIGN PATENT DOCUMENTS 2223004  3/1990  United Kingdom ................ 414/796.4

OTHER PUBLICATIONS

Product brochure for Industrial Resources of Michigan, Inc. (4 Pages).

*Primary Examiner*—Douglas Hess
*Attorney, Agent, or Firm*—Van Dyke, Gardner, Linn & Burkhart, LLP

[57] ABSTRACT

An accumulator for handling pallets in a pallet workstation provides a continuous through-put of panels through the pallet workstation. The accumulator includes a base, which is positioned between a pallet stack holder and a conveyor, and an articulating member supported by the base. The articulating member moves between a first position to receive a stack of pallets from the pallet stack holder and a second position to engage at least one of the pallets to move the pallet along the base to the conveyor. In this manner, the return fill cycle of the pallet stack holder is removed as a bottleneck in the pallet workstation. The accumulator can accommodate a wide range of pallet to pallet variation without affecting its reliability and, moreover, significantly increase the pallet sortation and inspection process.

37 Claims, 4 Drawing Sheets

PALLET WORKSTATION ACCUMULATOR

FIELD OF THE INVENTION

Background of the Invention

The present invention relates to material handling and, more specifically, to pallet handling equipment for use with a pallet work station, sortation system, or the like.

Pallet workstations are used to sort, inspect, and repair pallets and conventionally include a pallet stack holder and a sorting conveyor. The pallet stack holder delivers a stack of pallets to the conveyor where an operator typically manually inspects and sorts the pallets by type, vendor, repair needed, or the like.

Pallet stack holders generally fall into two categories—tipper assemblies and dispensing type assemblies. Tipper assemblies include an L-shaped member that is tilted from a first position in which the long side of the L-shaped member is upright and the short side is horizontal to a second position in which the long side is horizontal and the short side is vertical. When the short side of the L-shaped member is in the horizontal position, a stack of pallets can be loaded onto the tipper assembly. After loading, the tipper assembly moves the L-shaped member to the second position in which the long side of the tipper is horizontally disposed so that the pallets held on the L-shaped member can be moved off the tipper assembly onto the sorting conveyor. Tipper assemblies have several advantages. First, they present both sides of a pallet to the operator for inspection so the operator needs only to turn the pallet one time to complete the inspection of the pallet. Second, tipper assemblies are not sensitive to size variations in pallets—they can accommodate a wide variety of pallets even within a single stack without impairing the process or jeopardizing the reliability.

Dispensing assemblies, on the other hand, hold a stack of pallets generally vertical and dispense the lowermost pallet one at a time until all the pallets are moved from the dispensing assembly. However, dispensing assemblies are sensitive to variations in pallet size and require uniform pallet size to be dependable. Moreover, they require the operator to turn the pallet an additional turn in order to inspect all the sides of the pallet.

Even though pallets are manually inspected and sorted, the sortation rate for a workstation is typically limited by the return cycle of the pallet stack holder in which the pallet stack holder returns to the delivery conveyor to retrieve another stack of pallets. The fastest return cycle time for tipper assemblies is on the order of thirty-six seconds per cycle, which translates to the equivalent of handling six to ten pallets. While the bottom dispensing machines have reduced the cycle times—on the order of ten to fifteen seconds per cycle—their lack of flexibility has limited their use to only certain applications. Regardless of the type of pallet stack holder used, the pallet stack holder is usually the bottleneck of the pallet processing system.

To overcome these limitations, attempts have been made to introduce an intermediate stage between the pallet stack holders and the sorting conveyors. For example, in U.S. Pat. No. 4,462,746 to Smets, a side transfer system is disclosed in which the pallets on a tipper assembly are transferred sideways into a pallet indexer. However, the pallet indexer has a reload cycle time as well. Therefore, the delay has been merely transferred from the tipper assembly to the indexer. Therefore, the indexer does not achieve an optional cycle time in which there is a continuous through-put of pallets.

Consequently, there is a need for a workstation which will decrease the cycle time for processing pallets. Preferably, the workstation will include an apparatus that will accommodate a wide variety of pallet sizes and dimensions and yet provide a faster through-put than conventionally known pallet handling equipment.

SUMMARY OF THE INVENTION

The present invention provides an accumulator for a pallet workstation in which the accumulator provides a continuous through-put of pallets of various sizes from a conventional pallet stack holder to a sorting conveyor to thereby increase the pallet processing rate of the workstation.

In one form of the invention an accumulator for handling pallets in a pallet workstation includes a base, which is positioned between a pallet stack holder and a receiver, and a pair of engaging members supported by the base. The engaging members move between a first position to receive a stack of pallets from the pallet stack holder and a second position to engage at least one of the pallets to move the pallet along the base of the accumulator to the receiver.

In one aspect, the accumulator further includes a driver, which pivots the engaging members about their axes of rotation to move the engaging members from the first position for receiving the pallets to the second position. Preferably, the accumulator also includes a second driver which moves the engaging members across at least a portion of the base for moving a group of pallets across the base.

In another aspect, the accumulator includes an enclosure, which is supported by the base. The engaging members are supported by the enclosure. In a further aspect, the engaging members each include a pivot member which is rotatably supported by the enclosure and a pusher which is supported on the pivot member. In order to move the pallets across the base, the enclosure is preferably movably supported on the base, for example on a pair of rails.

In yet another aspect, the engaging members comprise a first articulating member and a second articulating member. The first and second articulating members are supported by the base and move between a first position to receive a stack of pallets from the pallet stack holder and to a second position to engage at least one of the pallets to move the pallet along the base to the receiver. The first articulating member and the second articulating member may be coupled together whereby motion of one articulating member induces motion in the other articulating member.

According to another form of the invention, an accumulator for handling pallets in a pallet workstation includes a base, which is positioned between a pallet stack assembly and a receiver, and a frame member which is movably supported on the base. The frame member includes a transverse passage, which receives a stack of pallets from the pallet stack holder and moves at least one pallet along the base to the receiver.

In one aspect, the accumulator includes a driver, which moves the frame member along the base. For example, the driver may include a pair of drive sprockets and a drive chain which extends around the drive sprockets and is drivingly coupled to the frame member. The drive chain is driven by the drive sprockets to move the frame member across the base. The drive sprockets are driven, for example, by a motor.

In another aspect, the accumulator includes a control system which includes at least one sensor for detecting a lowermost pallet from the stack of pallets entering the accumulator. The control system actuates the frame member for engaging at least the lowermost pallet and moving the pallets across the base when the sensor detects the presence of the lowermost pallet.

In yet another form of the invention, a pallet workstation for processing pallets is provided, which includes a tiltable holder, a receiver, and an accumulator. The tiltable holder is adapted for holding a stack of pallets and tilting the stack of pallets from a generally vertical position to a generally horizontal position and is adapted to move the pallets off the tiltable holder when the tiltable holder is in the generally horizontal position adjacent the accumulator. The accumulator is positioned between the tiltable holder and the receiver in order to provide a continuous through-put of pallets through the workstation and includes an input side and an output side. The tiltable holder moves the pallets off the tiltable holder and into the input side of the accumulator and through the accumulator, which is adapted to move the pallets from the input side to the output side and to deliver the pallets to the receiver.

It can be appreciated from the foregoing that the present invention significantly increase the processing rates for pallets at a workstation. Moreover, the accumulator can accommodate a wide range of piece to piece variation in the pallets. Furthermore, because the accumulator provides a direct through-put from the pallet stack assembly to the receiver, the accumulator also reduces the opportunities for the pallets to become jammed.

These and other objects, advantages, purposes and features of the invention will become more apparent from a study of the following description taken in conjunction with the drawings.

DETAILED DESCRIPTION OF THE PREFERRED EMBODIMENTS

Figure 1:
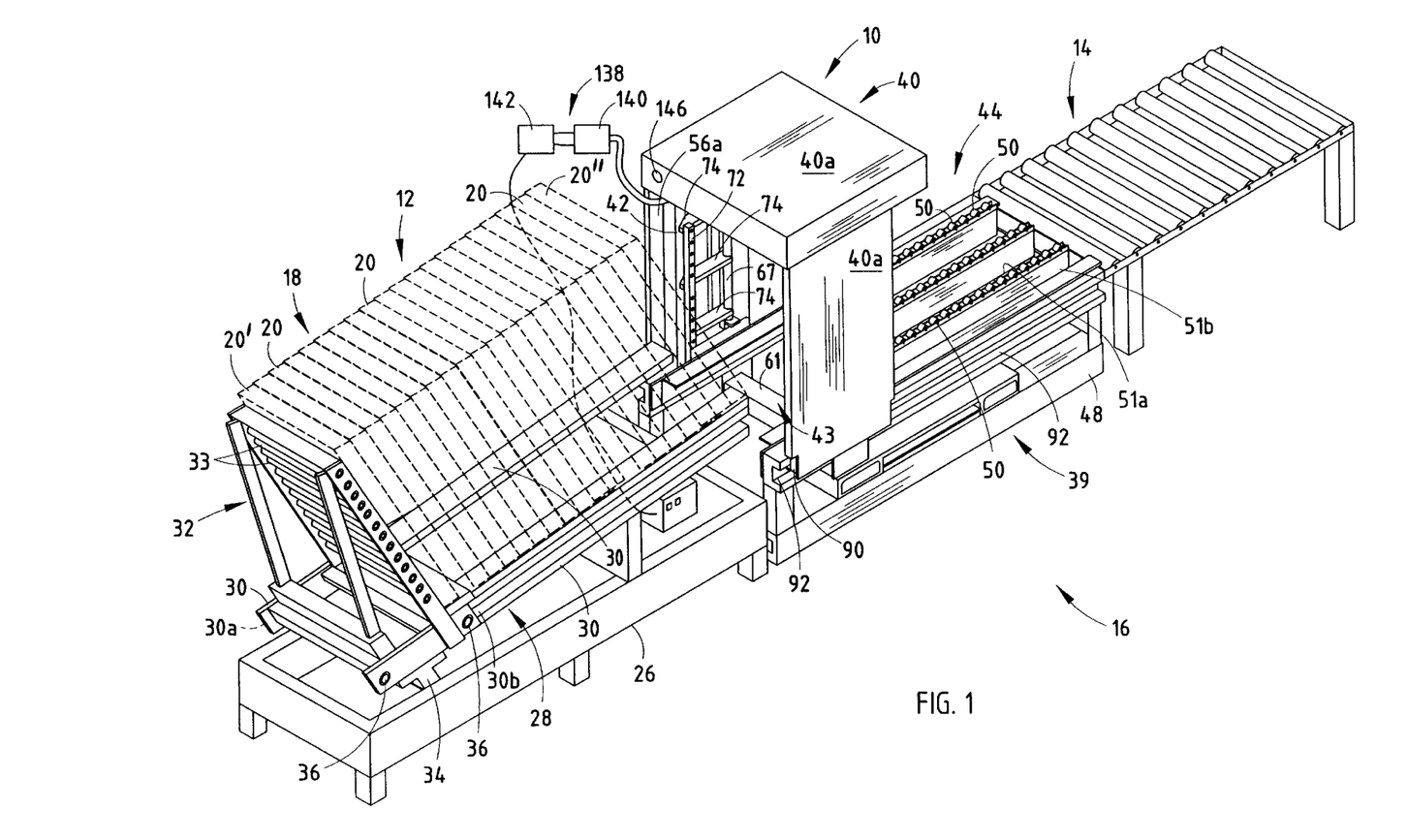
FIG. 1 is a perspective view of a pallet workstation, including a pallet stack, a sorting conveyor, and an accumulator of the present invention.

Referring to FIG. 1, an accumulator 10 of the present invention is shown positioned between a pallet stack holder 12 and a receiver, such as a sorting conveyor 14, to form a pallet workstation 16 in which pallets may be sorted, inspected for damage, and the like. Pallet workstation 16 is adapted to provide a continuous flow or through-put of pallets so that the pallet processing rate can be maximized.

A stack 18 of pallets 20 is delivered to pallet stack holder 12 from a delivery conveyor (not shown). The pallet stack holder in turn delivers the pallets to accumulator 10. Accumulator 10 provides an intermediate processing stage between pallet stack holder 12 and sorting conveyor 14 whereby the return or refill cycle of pallet stack holder 12 is no longer the bottleneck of the inspection and sortation process. Pallet stack holder 12 delivers and transfers pallets 20 to accumulator 10 which holds and delivers pallets 20 to an operator while pallet stack holder 12 returns to the delivery conveyor (not shown) to retrieve another stack of pallets. As a pallet 20 is passed through accumulator 10, the operator may inspect the facing side 21 of pallet 20 and then pivot pallet 20 about a lower edge 22 of pallet 20 to inspect the opposite side 24 of pallet 20 to determine whether pallet 20 needs to be repaired, recycled, or discarded or to identify the type or owner of the pallet.

Pallet stack holder 12 preferably comprises a conventional tipper assembly and includes a base 26 and an L-shaped frame 28, which is pivotally mounted to base 26 and moves from a generally vertical orientation (shown in phantom in FIG. 2) for receiving a vertical stack 18 of pallets 20 from the delivery conveyor (not shown) to a generally horizontal position (shown in FIG. 1) where pallets 20 are laid on their side for delivery to accumulator 10 and sorting conveyor 14. After inspection and sortation, conveyor 14 then delivers pallets 20 to a repair station, to a storage unit for undamaged pallets, to a disposal unit, or provides sortation by pallet type or owner or the like.

Figure 2:
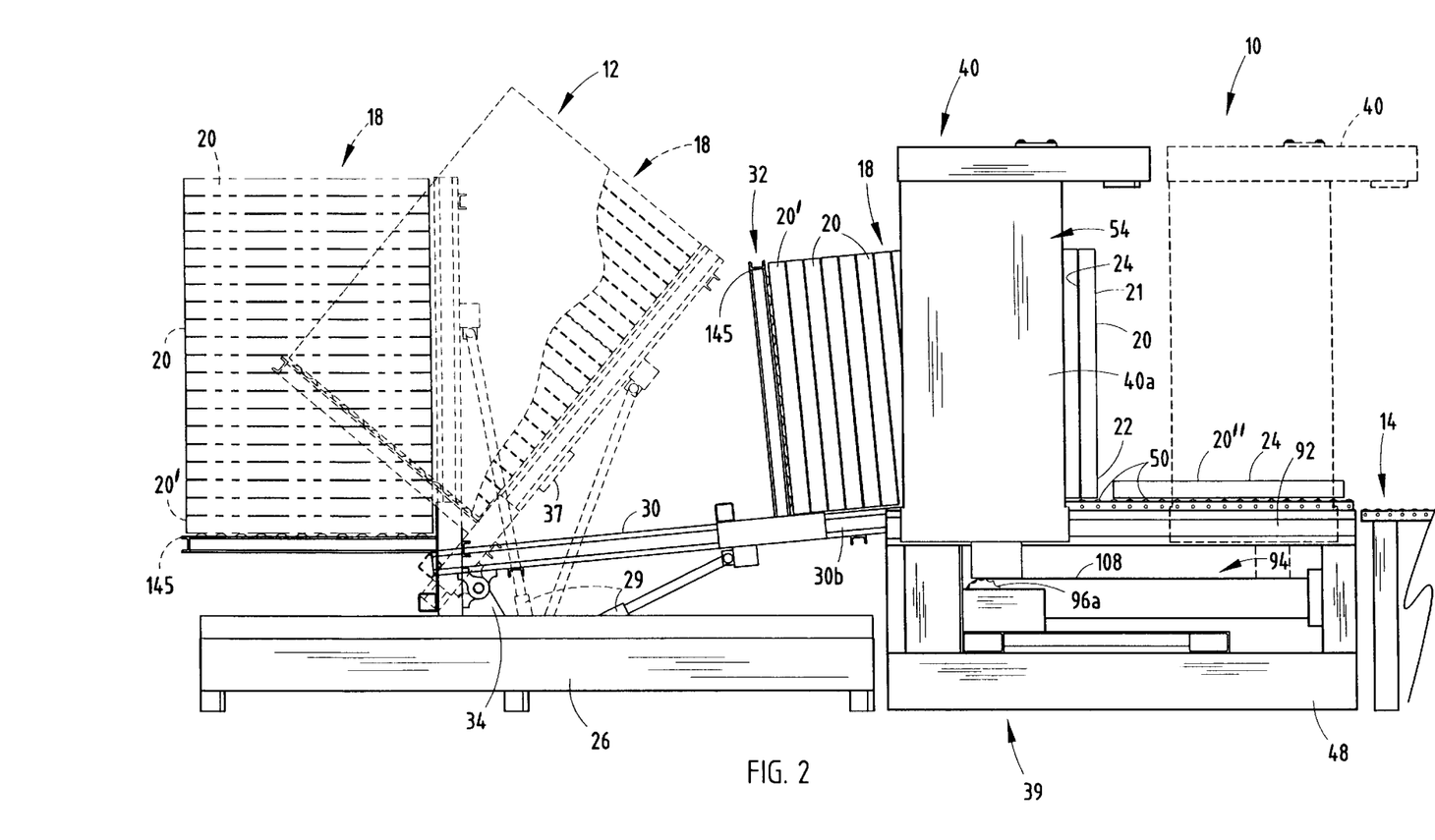
FIG. 2 is a side elevation view of the pallet workstation of FIG. 1.

As best seen in FIG. 1, L-shaped frame 28 includes a pair of spaced apart elongated support members 30 and a support base 32. Support base 32 is movably mounted to elongated support members 30 on elongated rails 30a and 30b and is adapted to move from a first position along members 30 where pallets 20 are loaded onto L-shaped frame 28 to a second position along members 30 to discharge pallets 20 from pallet stack holder 18, as will be more fully described. To ease loading of pallets 20 onto pallet stack holder, base 32 preferably includes a plurality of rollers 33 so that pallets 16 can be pushed onto L-shaped frame 28 with minimal force. L-shaped frame 28 is pivotally mounted to base 26 by a hinge 34 and is moved between its generally vertical position and its generally horizontal position by a driver, such as a pneumatic cylinder 29 (FIG. 2). Cylinder 29 extends or retracts to pivot L-shape frame 28 about a hinge 34 from its vertical position to its horizontal position where elongated support members 30 are generally or substantially parallel with base 26 and aligned such that pallets 20 are positioned for loading into accumulator 10. As best seen in FIG. 2, elongated support members 30 are preferably positioned at a slight angle with respect to base 26 so that pallets 20 will not topple over.

After L-shaped frame 28 is pivoted about hinge 34 to its generally horizontal loading position, support base 32 is moved and guided along elongated support members 30. Support base 32 is moveably mounted on rails 30a and 30b by a pair of guide rollers 36. Base 32 is moved on rollers 36 by a conventional driver 37 (FIG. 2), such as a cylinder, an electric drive, such as a servo motor, ball screw or a rack and pinion or the like. As base 32 moves along elongated support members 30, base 32 moves pallets 26 off elongated support members 30 and into accumulator 10. After the lowermost pallet 20' is pushed off elongated support members 30 by base 32, driver 37 returns support base 32 to its first position and cylinder 29 pivots L-shaped frame 28 about hinge 34 to return pallet stack holder 12 to its vertical loading position where another stack 18 can be loaded onto pallet stack holder 12 from the delivery conveyor.

Referring to FIG. 1, accumulator 10 includes a base 39 and a frame member 40, which is movably mounted with respect to base 39. Frame member 40 defines a transverse passage 42 that includes an input side 43 and an output side 44 of accumulator 10. As will be more fully described below, pallets 20 are received by accumulator 10 on input side 43 from pallet stack holder 12 and are moved from input side 43 to output side 44, where pallets 20 are dispensed to sorting conveyor 14 where pallets 20 are inspected for repair and sorting.

Figures 4, 5:
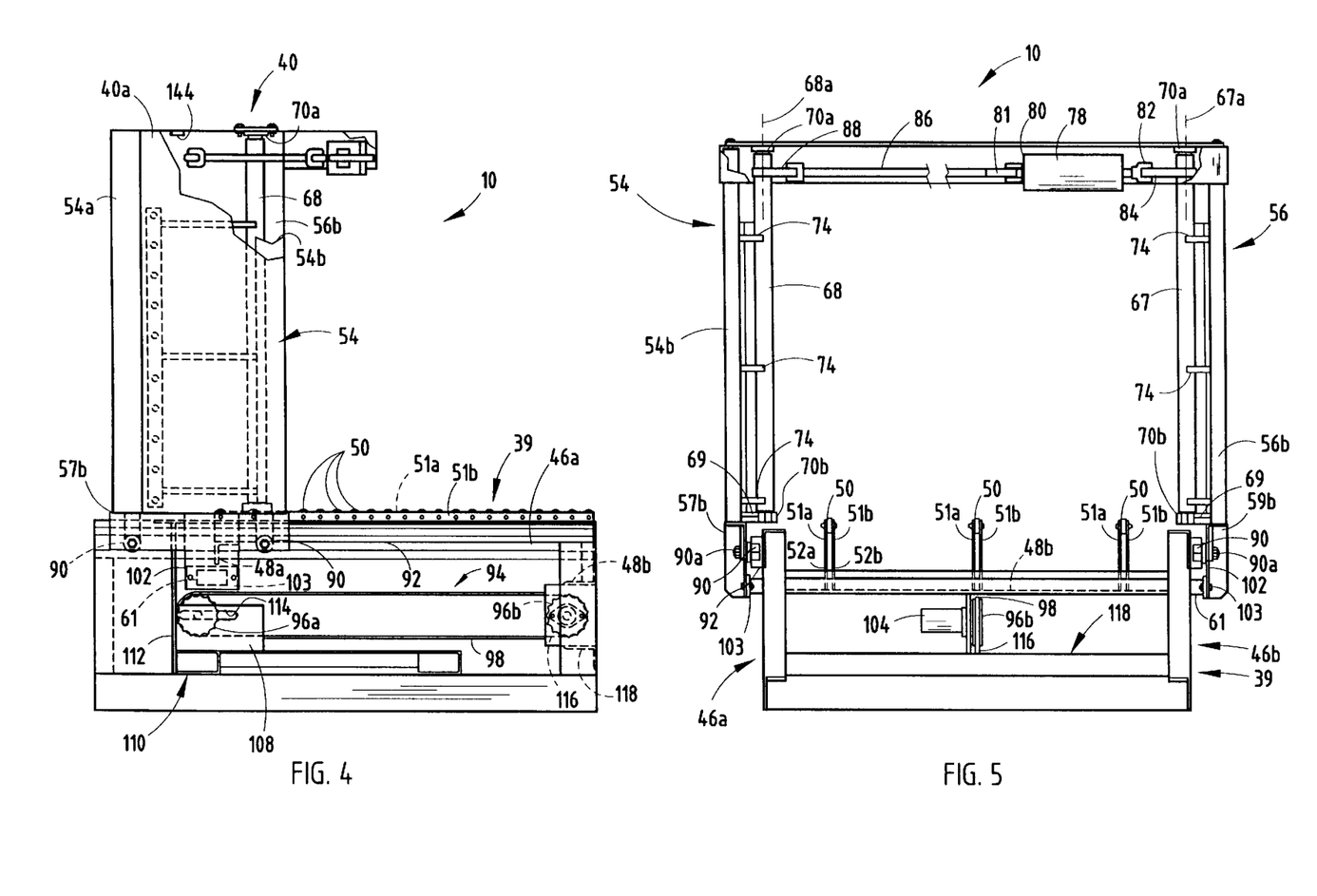
FIG. 4 is a partial cut-away side elevation view of the accumulator.
FIG. 5 is a partial cut-away end elevation view of the accumulator.

Base 39 includes a frame 48 and a plurality of bearing assemblies or rollers 50 which are mounted on frame 48 and arranged to provide a transport surface for pallets 20. As best seen in FIG. 5, rollers 50 are arranged to form at least two rows of rollers. Preferably, as shown in the illustrated embodiment, rollers 50 are arranged in three rows to provide more stability to pallets 20. Rollers 50 are mounted to frame 48 between vertical rails 51a and 51b which extend across base 39 and are supported by transverse base frame members 48a and 48b (FIG. 4). Transverse frame member 48b preferably comprises an angular member which is fixed at both ends to the sides 46a and 46b of base 39. Referring to FIGS. 4 and 5, rails 51a and 51b are each secured on one end to member 48a and on the other end to member 48b by extension plates 52a and 52b. Extension plates 52a and 52b are welded or otherwise rigidly secured to rails 51a and 51b on one end and to member 48b on the other end. Pallets 20 move across rollers 50 of base 39 under the driving force of pallet stack holder 12 and then subsequently under the driving force of frame member 40, as will be described below. Other types of transport surfaces may be used, such as steel slider rails and the like.

Figures 3, 6, 7:
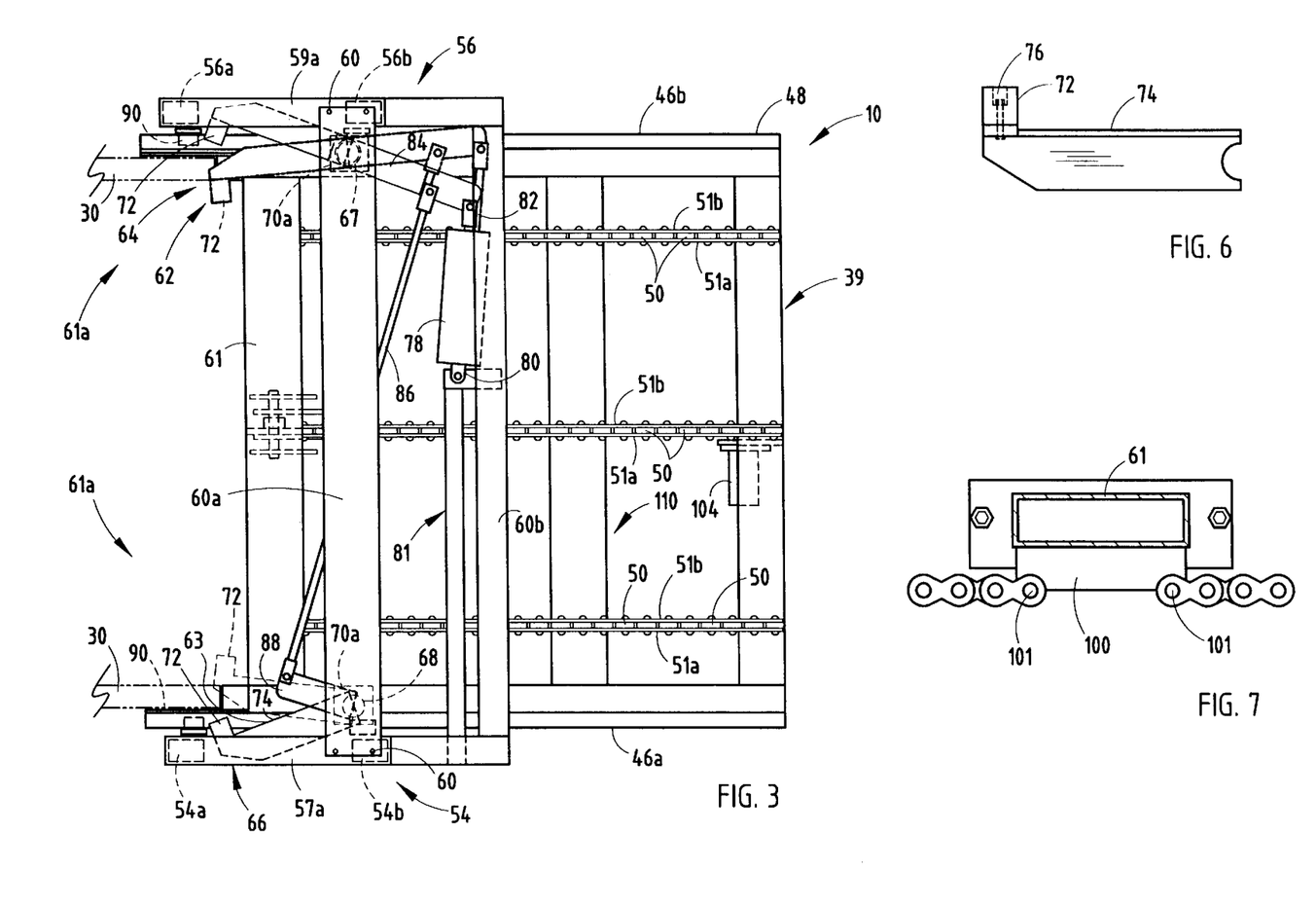
FIG. 3 is a partial cut-away plan view of the accumulator of FIGS. 1 and 2.
FIG. 6 is an enlarged plan view of an articulating gripper member of the accumulator.
FIG. 7 is an enlarged side elevation view of a coupler.

Referring to FIGS. 3–5, frame member 40 includes opposite rigid side panels 54 and 56, which are formed from vertical frame members 54a, 54b, 56a, and 56b, respectively. In FIG. 1, frame member 40 is shown provided with an optional cover 40a, preferably formed from sheet metal, which provides protection to the operator. Vertical frame members 54a and 54b are rigidly connected together by a first or upper transverse member 57a at an upper end and by a second or lower transverse member 57b at a lower end to thereby form rigid side panel 54. In a similar manner, vertical members 56a and 56b are rigidly connected together at one end by the first or upper transverse member 59a and at a second lower transverse member 59b. Side panels 54 and 56 are then connected together to form frame member 40 by upper transverse members 60a and 60b which are secured to the respective upper transverse members 57a and 59a of side panels 54 and 56. Transverse member 60a preferably comprises a plate and is secured to transverse members 57a and 59a by fasteners 60, such as bolts or rivets. Transverse member 60b, on the other hand, is preferably secured to transverse members 57a and 59a by welding. However, it should be understood that other conventional methods of securement can be used. Furthermore, side panels 54 and 56 are connected together by a second or lower transverse member 61, which will be more fully described below.

In order to hold or engage pallets 20, frame member 40 also includes a pair of engaging members 61a. In the illustrated embodiment, engaging members 61a are a pair of grippers defined by articulating members 62 and 63 which include a pusher or gripper arm 64, 66, respectively. Gripper arms 64, 66 are respectively mounted on rotating or pivotal members, for example shafts 67 and 68. Shafts 67 and 68 are rotatably mounted in frame member 40 on bearing mounts 70a and 70b (FIG. 5), which permit rotation of shafts 67 and 68 about their respective vertical axes 67a, 68a. As best seen in FIG. 5, bearing mounts 70a are secured to frame member 40 on transverse member 60a inwardly of the respective vertical members 54a, 54b, 56a, and 56b. On the other hand, bearing mounts 70b are secured to respective vertical members 54b and 56b of frame member 40 by projecting flanges 69. Gripper arms 64 and 66 are rotated about shafts 67 and 68 in order to grip the lowermost pallet 20' or the two lowermost pallets of stack 18 so that as frame member 40 moves across base 39, gripper arms 64 and 66 transfers pallets 20 to the output side of accumulator 10 to the operator so that pallets 20 can be individually inspected and then transferred to sorting conveyor 14. Engaging members 61a could alternatively be provided by solenoids, individual cylinders, or the like. Alternatively, instead of gripping pallets, the engaging members could abut the last pallet to shove the pallet stack portion.

Referring to FIGS. 1 and 3, each gripper arm 64 and 66 includes an elongated bearing member 72 which is mounted to shaft 67 and 68 by a plurality of vertically spaced arm members 74. Bearing members 72 preferably comprise a shock absorbing material, for example urethane, rubber, or the like, which is secured to respective arms 74 by fasteners 76, such as bolts or screws or the like (FIG. 6). However, it should be understood that bearing members 72 may also comprise rigid fingers or steel spikes. Shafts 67 and 68 are rotated on bearing mounts 70a and 70b by a driver 78 (FIG. 3). In the illustrated embodiment, driver 78 comprises an air cylinder. Cylinder 78 is mounted to frame member 40 at its base end 80 by an L-shaped support 81, which is secured to transverse members 57a and 60b, and pivotally mounted at its rod end 82 to a driver arm 84, which is secured to shaft 68. In this manner, when rod end 82 is extended from cylinder 78, driver arm 84 rotates shaft 68 about its axis 68a in a counter clockwise direction as viewed in FIG. 3. Alternatively, when rod end 82 is retracted into cylinder 78, driver arm 84 rotates shaft 68 about its axis 68a in a clockwise direction, as viewed in FIG. 3. Furthermore, driver arm 84 is coupled to shaft 67 by a linkage member 86 so that shafts 67 and 68 rotate in unison about their respective axes 67a and 68a to move gripping arms 64 and 66 either inwardly to a closed, engaging position to engage a pallet or outwardly to an open or receiving position to disengage from pallets 20. Linkage member 86 is pivotally mounted at one end to driver arm 84 and pivotally mounted at its second end to a crank arm 88, which in turn is fixed to shaft 67. Preferably, driver 78, driver arm 84, crank arm 88, and linkage member 86 are spaced above the gripper arms 64 and 66 and above the tops of pallets 20 to avoid interference and arranged to provide generally simultaneous movement of gripper arms between their respective positions.

As described previously, frame member 40 is moveably mounted with respect to base 39. Referring to FIGS. 4 and 5, frame member 40 includes a plurality of bearing assemblies 90 which are secured by conventional means, for example a bolt 90a, to lower transverse members 57b and 59b and are positioned inwardly to engage corresponding rails 92 provided on opposed sides of base 39. Frame member 40 is moved across base 39 by a driver 94, which moves frame member 40 between the loading position and unloading or discharge position. In the illustrated embodiment, driver 94 includes a pair of spaced apart drive sprockets 96a and 96b and a drive chain 98. Chain 98 extends around sprockets 96a and 96b and is coupled to lower transverse member 61 by a coupler 100 (FIG. 6). Sprockets 96a and 96b are driven by a motor 104, preferably a hydraulic motor. As motor 104 drives sprockets 96a and 96b, sprockets 96a and 96b pull chain 98 which in turn moves frame member 40 across base 39.

Referring to FIG. 6, coupler 100 preferably comprises a rigid plate, which is welded or otherwise secured to lower transverse member 61 on one side and secured by pins 101 to chain 98. To clear rails 92 and rollers 50, member 61 is offset below frame member 40 by extension plate members 102, which are rigidly secured to lower transverse members 57b and 59b. Member 61 is mounted to extension plate members 102 by flanges 103 which are bolted or otherwise secured to extension plate members 102.

Referring to FIG. 4, sprocket 96a is mounted to base 39 on a mounting plate 108, which is welded or otherwise rigidly secured to frame elements 110 and 112 of base 39. To provide adjustment for sprocket 96a, mounting plate 108 includes a slotted opening 114. As it is known in the art, slotted opening 114 permits sprocket 96a to be moved to take up the slack in chain 98. Sprocket 96b, on the other hand, is preferably mounted in a fixed position by a second mounting plate 116, which is rigidly mounted between to frame elements 48b and 118 of base 39. Mounting plate 116 also provides support for motor 104.

In operation, when pallets 20 are first loaded into accumulator 10, base 32 of pallet stack holder 12 moves pallets 20 along elongated support members 30. Pallet stack holder 12 is aligned so that pallets 20 are pushed onto base 39 and then onto rollers 50. In the initial loading sequence, frame member 40 is positioned on the down stream side of base 39 (shown in phantom in FIG. 2) where it continues to move pallets from the previous load of pallets to output side 44 of accumulator 10 until pallet stack holder 12 pushes the top most pallet 20" onto base 39. At this point, engaging members 61a are rotated about shafts 67 and 68 to their open or disengaged position and frame member 40 is moved back to the loading position on base 39. A portion of the next load is pushed through accumulator 10 by base 32 of pallet stack holder 12. While there are still enough pallets in accumulator 10 to provide an uninterrupted supply of pallets to the operator, while pallet stack holder 12 fetches another stack of pallets, engaging members 61a are actuated to rotate on shafts 67 and 68 to engage at least the lowermost pallet 20'. After engaging members 61a are engaged with lowermost pallet 20', motor 104 is actuated to rotate drive sprocket 96b and move drive chain 98 to move frame member 40 across base 39 and move pallets 20 across rollers 50 to the output side 44 of accumulator 10. By this time, pallet stack holder 12 is once again aligned with rollers 50 and base 32 and pushes the new load of pallets until they abut with the bottom pallet in the previous stack. Articulating members 62 and 63 release the last pallet and frame member 40 returns to its retracted position.

Referring to FIG. 1, workstation 16 preferably includes a control system 138. Control system 138 includes a first controller 140 for controlling accumulator 10 and a second controller 142 for controlling pallet stack holder 12. Controllers 140 and 142 each preferably comprise a programmable controller (PLC). It should be understood, however, that other conventional controllers can be used and, furthermore, that a single PLC may be used to control both accumulator 10 and pallet stack holder 12. Control system 138 also includes at least two sensors 144 and 145, which provide inputs to controllers 140 and 142. Sensors 144 and 145 which preferably comprise photo sensors, detect the presence of a pallet. Sensor 145 is preferably mounted on pallet stack holder 12 and positioned for detecting the lowermost pallet being discharged from pallet stack holder 12 so that when controller 142 receives a signal from sensor 145 that the lowermost pallet has been discharged, controller 142 actuates driver 37 to move base 32 to its loading position to retrieve another stack of pallets 20. In a similar manner, sensor 144 is mounted in frame member 40 and positioned to detect when the lowermost pallet 20' has been moved onto base 39 from pallet stack holder 12. When sensor 145 signals controller 140 that the lowermost pallet is moved onto base 39, controller 140 actuates driver 78 to move engaging members 61a to their closed position and to actuate motor 104 to move frame member 40 across base 32. Furthermore, frame member 40 may optionally include a third sensor 146, which detects a stack of pallets being delivered to accumulator 10. In this manner, when a second stack of pallets is delivered to accumulator 10, control 140 will actuate engaging members 61a to move to their open position and frame member 40 to move to the downstream side of base 39 to receive pallets 20. Alternatively, controller 142 may signal controller 140 to return frame member 40 to its loading position when pallet stack holder 12 is positioned for unloading pallets 20 onto base 39.

It should be understood from the foregoing that accumulator 10 allows continuous throughput of pallets through workstation 12 and can accommodate a wide pallet to pallet variation without the corresponding delays associated with conventional pallet sortation workstations.

While several forms of the invention have been shown and described, other forms will now be apparent to those skilled in the art. For example, frame member 40 may be formed from a different arrangement of frame elements and, similarly, engaging members 61a may comprise other configurations. Furthermore, sensors other than photo sensors may be used, for example pressure sensors. Moreover, sensors may be provided as a backup, with the control system designed based on a timed sequence and the sensors providing feed back rather than as acting as actuators. Therefore, it will be understood that the embodiments shown in the drawings and described above are merely for illustrative purposes and are not intended to limit the scope of the invention which is defined by the claims which follow.

We claim:

1. An accumulator for handling pallets in a pallet workstation, the workstation having a pallet stack holder, the pallet stack holder being adapted for receiving a generally vertical stack of pallets, for tilting the stack of pallets from a generally vertical position to a generally horizontal position, and for moving the pallets off the pallet stack holder, the workstation further having a receiver for receiving the pallets, said accumulator comprising:

a base adapted for positioning between the pallet stack holder and the receiver, said base including a first member and a second member movably supported on said first member; and a pair of pushers supported by said second member, said pushers being adapted to move away from each other to receive at least a portion of a stack of pallets from the pallet stack holder and toward each other to engage at least one of the pallets for moving the portion along said first member toward the receiver.

2. An accumulator according to claim 1, wherein said base includes a transport surface.

3. An accumulator according to claim 2, wherein said transport surface comprises a plurality of rollers.

4. An accumulator according to claim 1, further comprising a driver, each of said pushers including an axis of rotation, and said driver pivoting said pushers about said axes of rotation to move said pushers from said first position for receiving the pallets to said second position.

5. An accumulator according to claim 4, further comprising a second driver, said second driver moving said pushers across at least a portion of said base for moving a group of pallets across said base.

6. An accumulator according to claim 1, said second member comprising a frame, said frame being supported by said base, and said pushers being supported by said frame and being movable with said frame along said base.

7. An accumulator according to claim 6, wherein each of said pushers is supported on a respective pivot member, and said pivot members being rotatably supported in said frame.

8. An accumulator according to claim 1, wherein said pushers comprise a first articulating member and a second articulating member, said first articulating member and said second articulating member being supported by said second member and being adapted to move between a first position to receive a stack of pallets from the pallet stack holder and to a second position to engage at least one of the pallets to move the pallet along said first member to the conveyor.

9. An accumulator according to claim 8, wherein each of said articulating members comprises a pusher member and a pivotal member, each of said pusher members being supported by a respective pivotal member, and said pivotal members being adapted to move said pusher members between their respective first positions and second positions.

10. An accumulator according to claim 9, further comprising a driver, said driver pivoting said pusher members about their respective pivotal members between said respective first positions and second positions.

11. An accumulator according to claim 10, further comprising a second driver, said second driver moving said articulating members across said first member for moving the pallets across said first member.

12. An accumulator according to claim 8, said first articulating member and said second articulating member being coupled together whereby motion of one of said first articulating member and said second articulating member induces motion in the other of said first articulating member and said second articulating member.

13. An accumulator for handling pallets in a pallet workstation, the workstation having a pallet stack holder, the pallet stack holder being adapted for receiving a generally vertical stack of pallets, for tilting the stack of pallets from a generally vertical position to a generally horizontal position, and for moving the pallets off the pallet stack holder, the workstation further having a receiver for receiving the pallets, said accumulator comprising:

a base adapted for positioning between the pallet stack holder and the receiver; and a pair of engaging members supported by said base, said engaging members comprising a first articulating member and a second articulating member, said first articulating member and said second articulating member being supported by said base and being adapted to move between a first position to receive a stack of pallets from the pallet stack holder and a second position to engage at least one of the pallets to move the pallet alone said base to the receiver, said first articulating member and said second articulating member being coupled together wherein motion of one of said first articulating member and said second articulating member induces motion in the other of said first articulating member and said second articulating member, and said first articulating member and said second articulating member being coupled by a linkage member whereby counterclockwise motion of one of said articulating members induces clockwise motion of the other of said articulating members such that said articulating members substantially move in unison to move away from each other to receive the pallets and move toward each other to engage at least one pallet therebetween.

14. An accumulator for handling pallets in a pallet workstation, the workstation having a pallet stack holder, the pallet stack holder being adapted for receiving a generally vertical stack of pallets, for tilting the stack of pallets from a generally vertical position to a generally horizontal position, and for moving the pallets off the pallet stack holder, the workstation further having a receiver for receiving the pallets, said accumulator comprising:

a base adapted for positioning between the pallet stack holder and the receiver;

a pair of engaging members supported by said base, said engaging members being adapted to move between a first position to receive a portion of a stack of pallets from the pallet stack holder and a second position to engage at least one of the pallets for moving the pallet along the base toward the receiver; and an enclosure, said enclosure being supported by said base, and said engaging members being supported by said enclosure, said enclosure being movably supported on said base.

15. An accumulator according to claim 14, wherein said base includes a pair of rails, said enclosure being movably supported on said rails.

16. An accumulator according to claim 15, one of said enclosure and said rails including bearings, and said bearings movably supporting said enclosure on said rails.

17. An accumulator for handling pallets in a pallet workstation, the workstation having a pallet stack holder adapted for receiving a generally vertical stack of pallets, for tilting the stack of pallets from a generally vertical position to a generally horizontal position, and for moving the pallets off the pallet stack holder, the workstation further having a conveyor for receiving the pallets and transporting the pallets to a desired destination, said accumulator comprising:

a base adapted for positioning between the pallet stack holder and the conveyor; and a frame member movably supported on said base, said frame member having a transverse passage extending therethrough, said frame member adapted to receive a stack of pallets in said transverse passage from the pallet stack holder, and said frame member translating along said base and moving at least one pallet along the base to the conveyor.

18. An accumulator according to claim 17 further comprising a driver, said driver moving said frame member along said base.

19. An accumulator according to claim 18, wherein said base includes one of a plurality of slider rails and a plurality of rollers for supporting the pallets.

20. An accumulator according to claim 18, wherein said driver includes a drive chain and a pair of drive sprockets, said drive chain extending around said drive sprockets and being drivingly coupled to said frame member, and said drive chain being driven by said drive sprockets to move said frame member across said base.

21. An accumulator according to claim 20, wherein said driver includes a motor, said motor being coupled to one of said drive sprockets.

22. An accumulator according to claim 17, further comprising a control system, said control system including at least one sensor, said sensor detecting a lowermost pallet from the stack of pallets, and said control system actuating said frame member for engaging at least said lowermost pallet and moving the pallets across said base when said sensor detects the presence of the lowermost pallet.

23. An accumulator according to claim 22, wherein said frame member includes a pair of spaced apart pushers, said pushers being adapted to move between a first position for receiving the pallets in said transverse passage and a second position for engaging at least the lowermost pallet and moving the pallets across said base.

24. An accumulator according to claim 23, wherein said sensor is mounted on said frame member.

25. An accumulator according to claim 17, wherein said base includes a pair of rails, said frame member being movably supported on said rails of said base.

26. A pallet workstation for processing pallets, said workstation comprising:

a tiltable holder adapted for holding a stack of pallets and tilting the stack of pallets from a generally vertical position to a generally horizontal position, said tiltable holder further adapted to move the pallets off said tiltable holder when said tiltable holder is in said generally horizontal position;

a conveyor; and an accumulator positioned between said tiltable holder and said conveyor, said accumulator having an input side, an output side, and a transverse passage, said accumulator including a base and a frame member moveably supported on said base, said tiltable holder adapted for moving the pallets off said tiltable holder into said input side of said accumulator and into said base, said frame member defining said transverse passage and translating along said base for moving the pallets across said base to move the pallets from said input side to said output side and to deliver the pallets to said conveyor.

27. A pallet workstation according to claim 26, further comprising a control system, said control system actuating said tiltable holder to tilt said tiltable holder and to actuate said tiltable holder for moving the pallets off the tiltable holder and into said accumulator and actuating said accumulator for moving the pallets to the conveyor.

28. A pallet workstation according to claim 27, wherein said control system includes at least one sensor, said sensor detecting when said tiltable holder moves the lowermost pallet of the stack of pallets into the accumulator, and said control system in response to said sensor detecting the lowermost pallet actuating said accumulator to move the pallets from said input side to said output side for delivering pallets to said conveyor.

29. A pallet workstation according to claim 26, wherein said accumulator includes a pair of pushers supported by said base, said pushers being adapted to move the pallets to said output side for delivering the pallets to said conveyor.

30. A pallet workstation according to claim 29, wherein said pushers are pivotally supported by said frame member, each of said pushers being adapted to pivot from a first position when said frame member receives the pallets from said tiltable holder to a second position when said frame member moves the pallets to said output side of said accumulator.

31. An accumulator according to claim 30, wherein said pushers are slidably supported on said base by said frame member for moving the pallets across said base to said conveyor.

32. An accumulator according to claim 29, wherein said pushers are supported by said frame member.

33. An accumulator according to claim 32, said frame member being slidably supported on said base, and said pushers being positioned and pivotally mounted to said frame member in said transverse passage.

34. An apparatus for providing a substantially uninterrupted supply of pallets to a receiving area from a supply area, said apparatus comprising:

a pallet stack holder having a base and a support member, said base being movable along said support member between a first end portion to a second end portion of the support member and receiving a first load of pallets from the supply area when said support member is substantially vertical and said base is positioned at said first end portion; and an accumulator positioned adjacent said second end portion of said support member and aligned with said support member, said accumulator receiving the first load of pallets when said support member is substantially horizontal and said base member moves along said support member to said second end portion to dispense the first load of pallets to said accumulator, said accumulator dispensing the first load of pallets to the receiving area while said support member returns to a generally vertical position and said base returns to said first end portion to receive a second load of pallets from the supply area.

35. The apparatus in claim 34 wherein said pallet stack holder dispenses the second load of pallets to said accumulator while said accumulator dispenses said first load of pallets to the receiving area.

36. The apparatus in claim 34 in which said accumulator includes a member defining an opening which is generally aligned with said support member when said support member is substantially horizontal wherein said base dispenses said first load of pallets through said opening.

37. The apparatus in claim 36 including a pair of arms in said opening which engage at least one pallet of said first load of pallets and extend toward said receiving area to dispense said second portion of pallets to said receiving area.

* * * * *

UNITED STATES PATENT AND TRADEMARK OFFICE
CERTIFICATE OF CORRECTION

PATENT NO. : 6,050,771
DATED : April 18, 2000
INVENTOR(S) : Gerald L. Dykstra It is certified that error appears in the above-identified patent and that said Letters Patent is hereby corrected as shown below:

Column 9,
Line 51, "alone" should be -- along --

Signed and Sealed this

Eighth Day of February, 2005

JON W. DUDAS
*Director of the United States Patent and Trademark Office*